US012017202B2

(12) United States Patent
Choi et al.

(10) Patent No.: US 12,017,202 B2
(45) Date of Patent: Jun. 25, 2024

(54) HYDROCARBON ADSORPTION AND DESORPTION COMPLEX INCLUDING GAS ADSORBING PORTION AND REINFORCING PORTION AND METHOD FOR PREPARING THE SAME

(71) Applicant: Korea University Research and Business Foundation, Seoul (KR)

(72) Inventors: Jungkyu Choi, Seoul (KR); Kwan-Young Lee, Seoul (KR); Jinseong Kim, Seoul (KR); Eunhee Jang, Anyang-si (KR); Layoung Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 30 days.

(21) Appl. No.: 17/533,693

(22) Filed: Nov. 23, 2021

(65) Prior Publication Data

US 2022/0161228 A1    May 26, 2022

(30) Foreign Application Priority Data

Nov. 24, 2020    (KR) .......................... 10-2020-0158378

(51) Int. Cl.
*B01J 20/18*    (2006.01)
*B01D 53/02*    (2006.01)
(Continued)

(52) U.S. Cl.
CPC ............ *B01J 20/186* (2013.01); *B01D 53/02* (2013.01); *B01J 20/28016* (2013.01);
(Continued)

(58) Field of Classification Search
CPC ...... B01D 2253/108; B01D 2253/1085; B01D 2253/304; B01D 2257/702;
(Continued)

(56) References Cited

U.S. PATENT DOCUMENTS 10,159,967 B1    12/2018    Al-Khattaf et al.

FOREIGN PATENT DOCUMENTS

CN    101723401 A    *    6/2010
CN    109759035 A         5/2019
(Continued)

OTHER PUBLICATIONS

Prech et al. ACSCatal.2020, 10,2544-2555 (Year: 2020).*
(Continued)

*Primary Examiner* — Samir Shah
*Assistant Examiner* — Jordan W Taylor
(74) *Attorney, Agent, or Firm* — NSIP Law

(57) ABSTRACT

Disclosed are a hydrocarbon adsorption and desorption complex that reduces emission of hydrocarbon from vehicle exhaust gas and improves hydrothermal stability of a device, and a method for preparing the same. The hydrocarbon adsorption and desorption complex may have improved adsorption ability of the hydrocarbon as metal ions are bound to a gas adsorbing portion containing aluminum, and may have improved hydrothermal stability as a reinforcing portion made of silica is formed on a surface of the gas adsorbing portion.

13 Claims, 7 Drawing Sheets

(51) Int. Cl.
  *B01J 20/28* (2006.01)
  *B01J 20/30* (2006.01)

(52) U.S. Cl.
  CPC ..... *B01J 20/28085* (2013.01); *B01J 20/3057* (2013.01); *B01J 20/3078* (2013.01); *B01D 2253/1085* (2013.01); *B01D 2253/304* (2013.01); *B01J 2220/42* (2013.01)

(58) Field of Classification Search
  CPC .... B01D 2258/01; B01D 53/02; B01D 53/04; B01J 20/06; B01J 20/183; B01J 20/186; B01J 20/28016; B01J 20/28085; B01J 20/3057; B01J 20/3078; B01J 20/3085; B01J 20/3236; B01J 20/3466; B01J 2220/42; Y02T 10/12
  See application file for complete search history.

(56) References Cited

FOREIGN PATENT DOCUMENTS

| | | |
|---|---|---|
| CN | 111482157 A | 8/2020 |
| CN | 111542388 A | 8/2020 |
| JP | 2012-116723 A | 6/2012 |
| JP | 2014-530163 A | 11/2014 |
| KR | 10-1677253 B1 | 11/2016 |
| KR | 10-2018-0119612 A | 11/2018 |
| KR | 10-2019-0081424 A | 7/2019 |

OTHER PUBLICATIONS

Wang et al. Catalysis Today 2019, 327, 295-307 (Year: 2019).*
Kim et al. Catalysis Today 314, 2018, 78-93 (Year: 2018).*
Verboekend et al. Chimia 2013, 67, 5, 327-332 (Year: 2013).*
Ghorbanpour et al. ACS Nano, 2015, 9, 4, 4006-4016 (Year: 2015).*
Belarbi et al. Eur. Phys. J. Special Topics 224, 1963-1976 (2015) (Year: 2015).*
Huang et al. CN101723401A English Translation (Year: 2011).*
Miyamoto et al., Adv. Mater. 2005, 17, 1985-1988 (Year: 2005).*
Joyner, Richard, et al., "Preparation, Characterization, and Performance of Fe-ZSM-5 Catalysts" The Journal of Physical Chemistry B 103.29 (1999): 5963-5976.
Korean Office Action issued on Jun. 8, 2022, in counterpart Korean Patent Application No. 10-2020-0158378 (10 pages in Korean).
Chinese Office Action issued on Jan. 9, 2024, in counterpart Chinese Patent Application No. 202111406047.4 (9 pages in Chinese).

* cited by examiner

[FIG. 1]
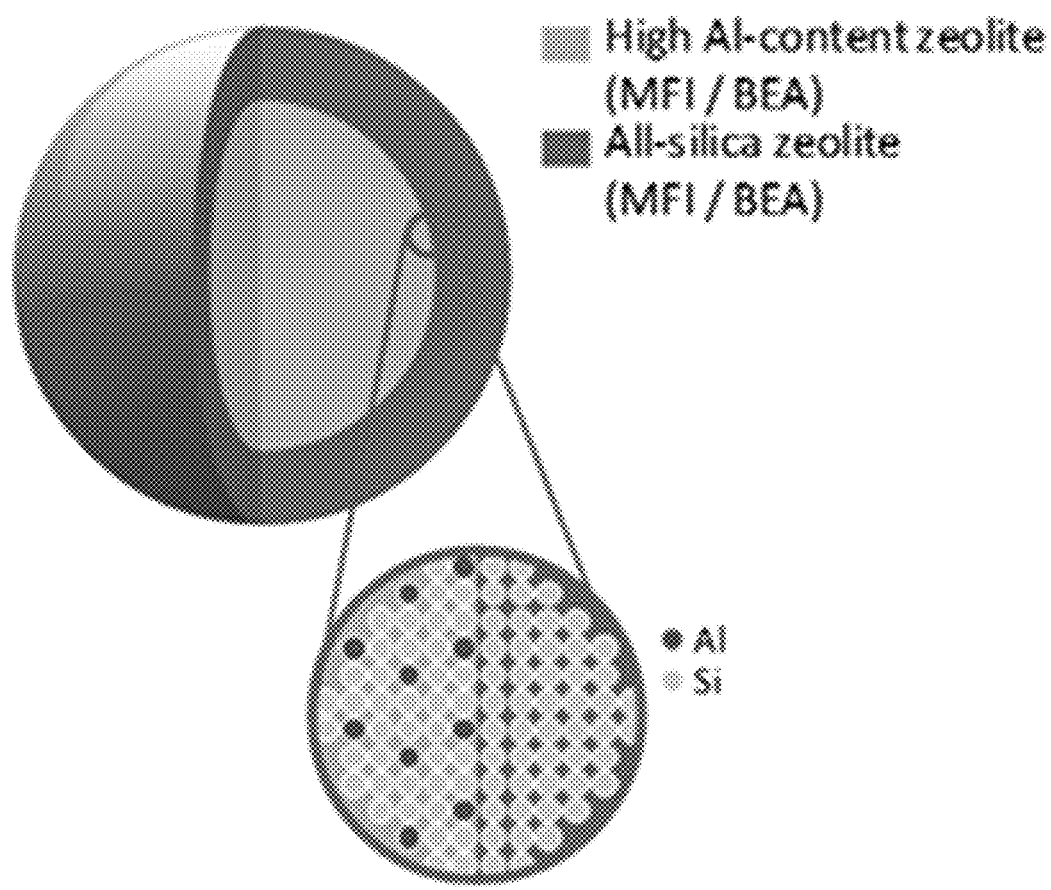

[FIG. 2]
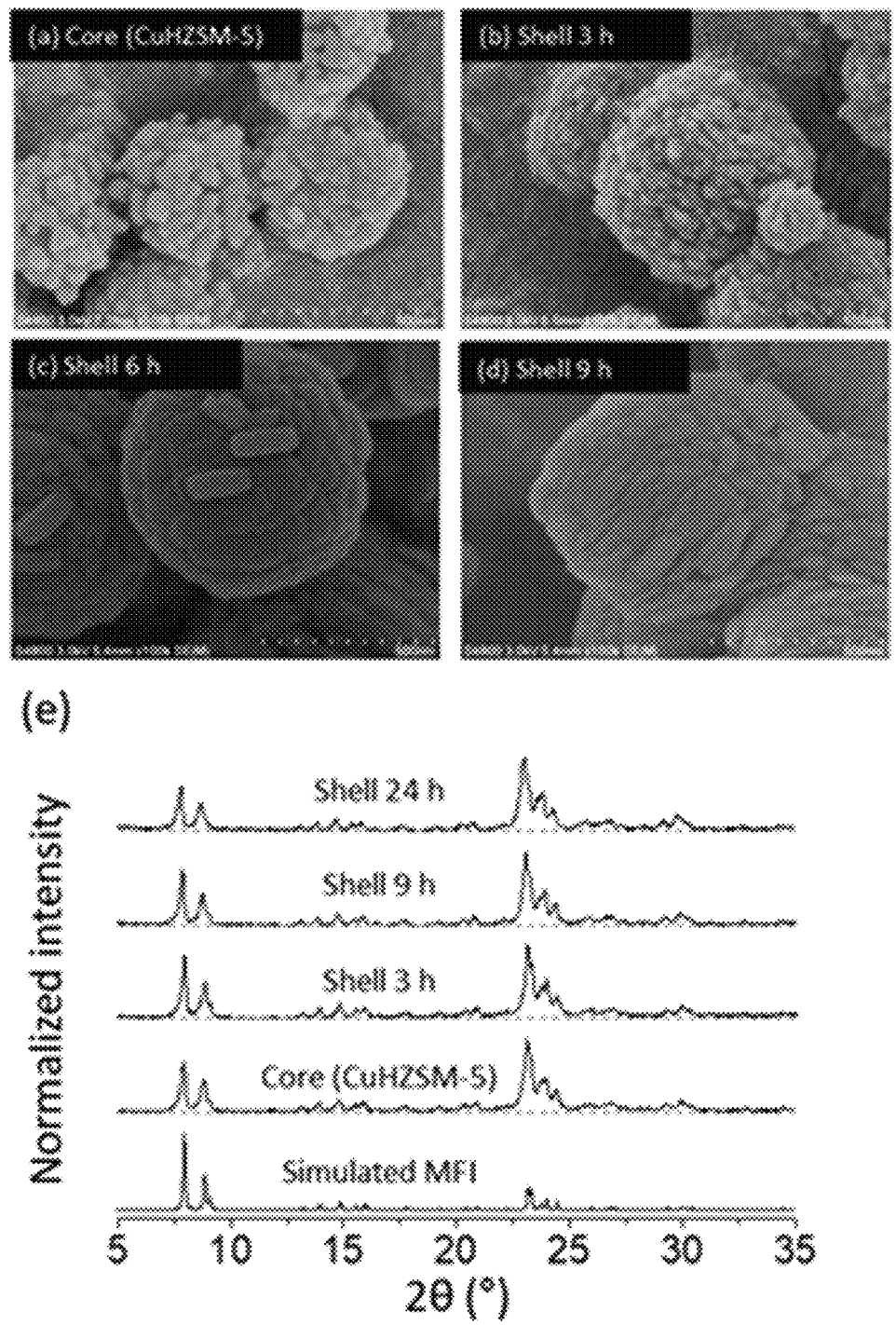

[FIG. 3]
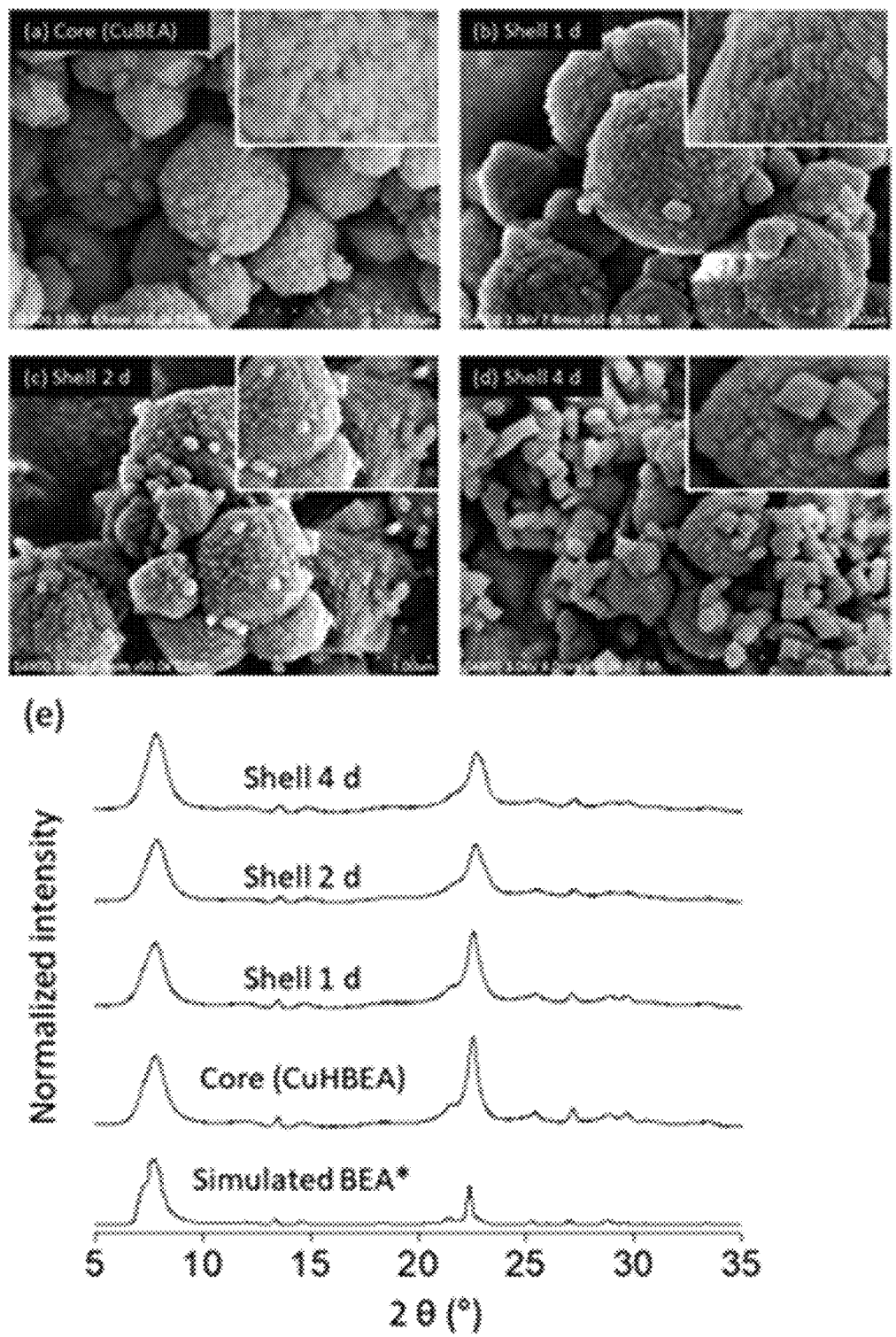

[FIG. 4]
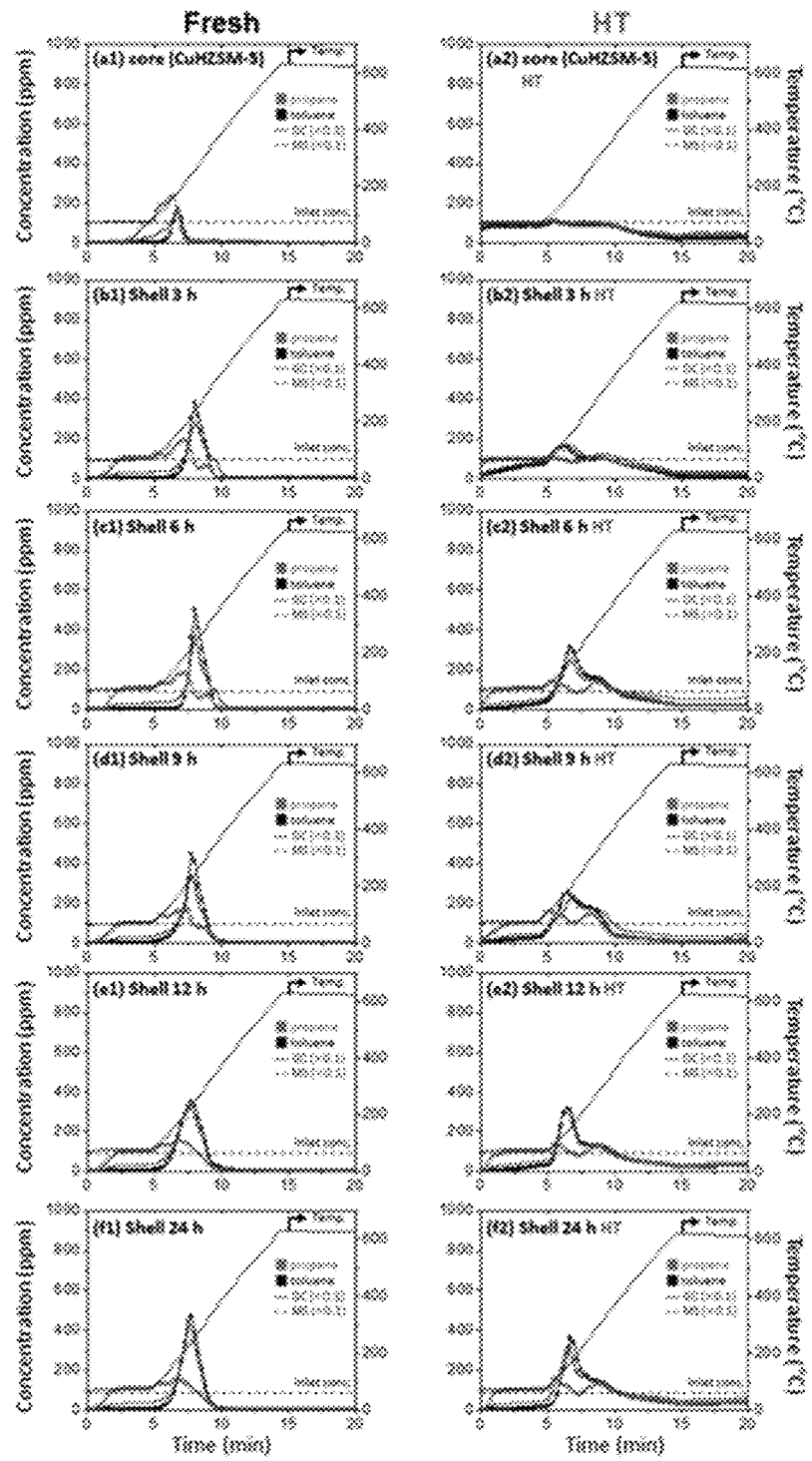

[FIG. 5]
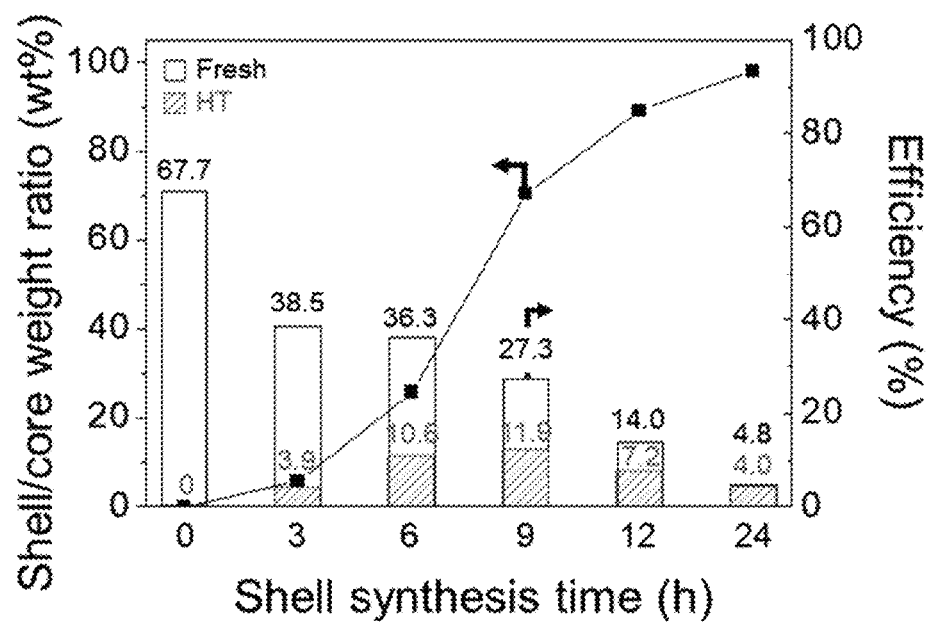

[FIG. 6]
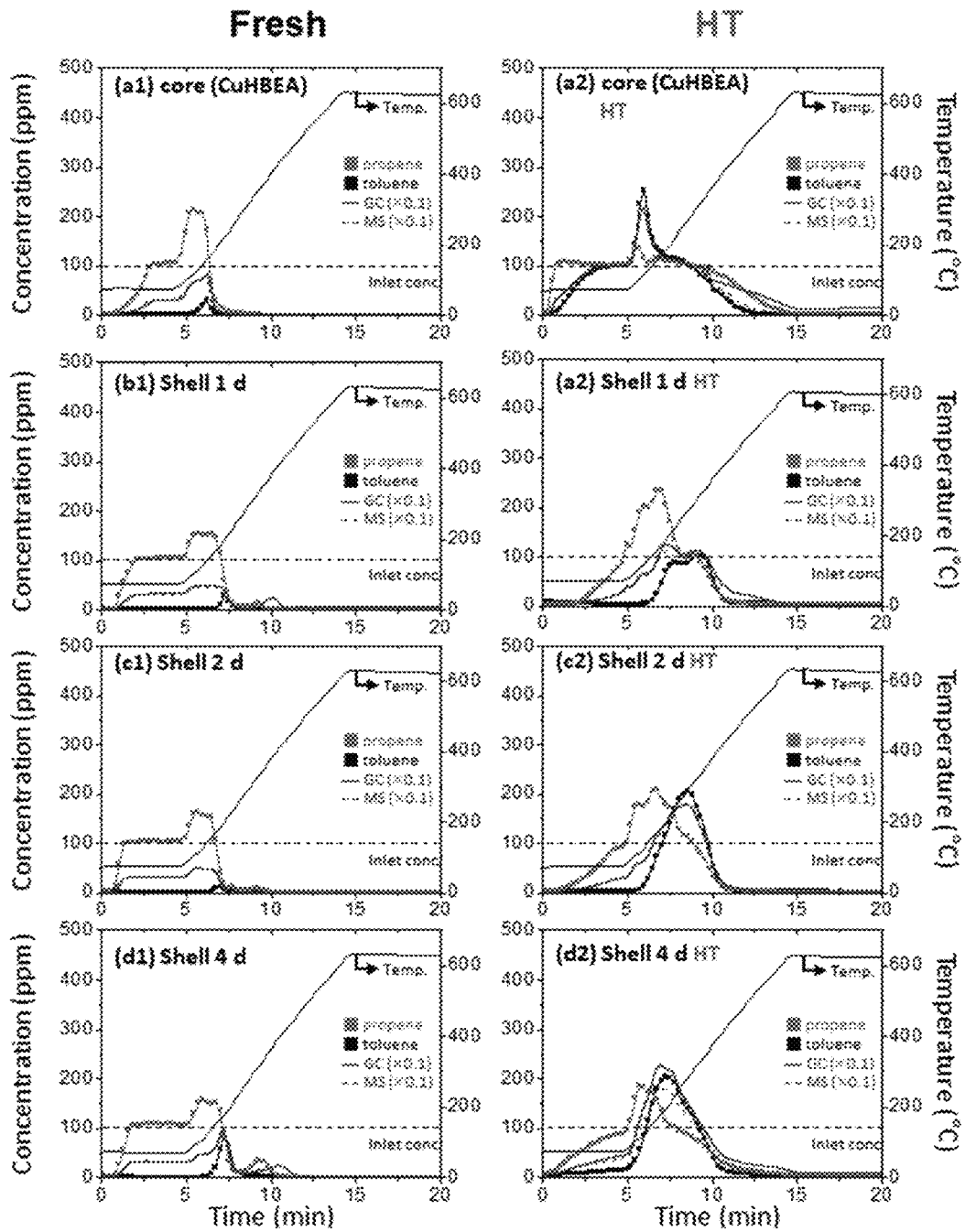

[FIG.7]
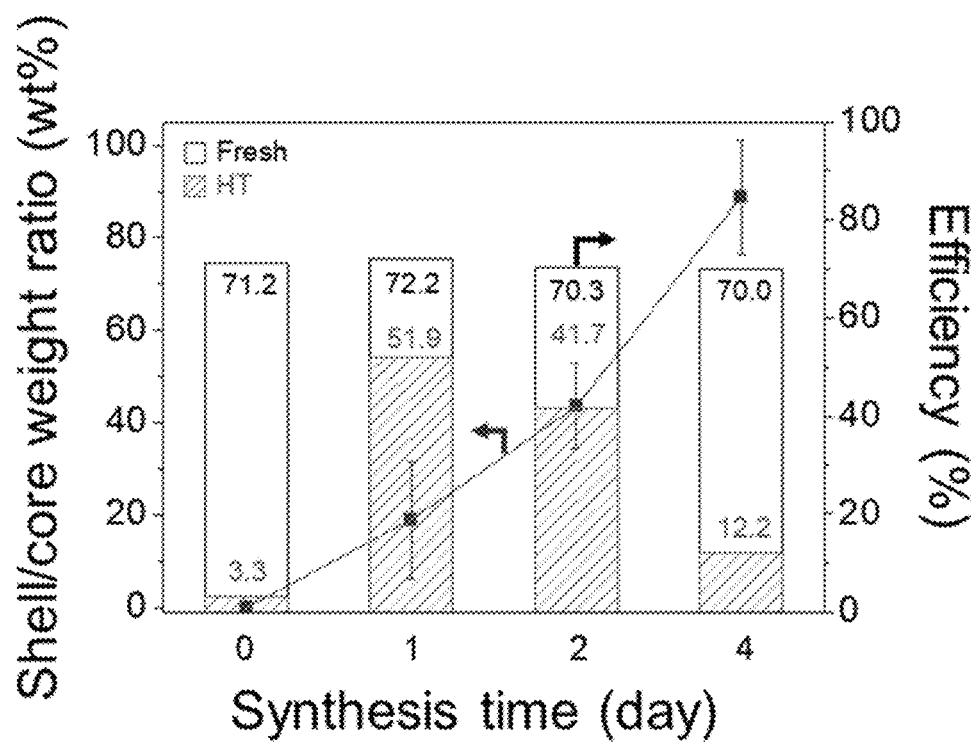

HYDROCARBON ADSORPTION AND DESORPTION COMPLEX INCLUDING GAS ADSORBING PORTION AND REINFORCING PORTION AND METHOD FOR PREPARING THE SAME

CROSS-REFERENCE TO RELATED APPLICATION

This application claims a benefit under 35 U.S.C. § 119(a) of Korean Patent Application No. 10-2020-0158378 filed on Nov. 24, 2020, in the Korean Intellectual Property Office, the entire disclosure of which is incorporated herein by reference for all purposes.

BACKGROUND

1. Field

The present disclosure relates to a hydrocarbon adsorption and desorption complex that reduces emission of hydrocarbon from vehicle exhaust gas and improves hydrothermal stability of a device, and more specifically, to an adsorption and desorption complex in which a reinforcing portion containing silica-zeolite is formed on a surface of a gas adsorbing portion containing aluminum-containing zeolite particles, and a method for preparing the same.

2. Description of Related Art

As interest in air pollution increases, regulations of exhaust gases such as carbon monoxide (CO), nitrogen oxide (NOx), hydrocarbon (HC), particulate matter (PM), and the like emitted from gasoline and diesel vehicles are being strengthened in the United States, Europe, and the like. In particular, over time from Euro 1 in 1992 to Euro 6d in 2020, emission of the hydrocarbon (HC) should be reduced by 80% or more compared to that in 1992. In a case of the emission of the hydrocarbon (HC) from the gasoline vehicle, the hydrocarbon equivalent to 50 to 80% of emission of the hydrocarbon emission during an operation period is emitted in a cold start period during which three-way catalysts (TWCs, acting on HC oxidation) are not active, Research on a hydrocarbon adsorbent (a HC trap) is in progress to reduce the hydrocarbon emitted during the cold start period. The hydrocarbon adsorbent is a device that adsorbs the hydrocarbon emitted during the cold start period and desorbs the already adsorbed hydrocarbon when a temperature (about 200 to 300° C.) at which the three-way catalysts are active is reached.

A lot of research using zeolite with high physical and chemical stability as the hydrocarbon adsorbent is in progress. A performance of the hydrocarbon adsorbent is tested by measuring adsorption and desorption of propene and toluene, which are representative substances emitting the hydrocarbon of the gasoline vehicle. Research on the performance of the hydrocarbon adsorbent based on a zeolite structure, a Si/Al value, and whether metal is impregnated was conducted. As an Al content of the zeolite increases (i.e., as the Si/Al value decreases), a higher amount of hydrocarbon was adsorbed to the zeolite. Further, among various zeolite structures, a ZSM-5 and a beta structure zeolite showed high performance However, the hydrocarbon adsorbent made of only the zeolite is not able to sufficiently treat the hydrocarbon generated in the cold start period until the temperature at which at which the three-way catalysts are active is reached because of low hydrocarbon adsorption and oxidation forces at a temperature equal to or lower than 300° C., and has a problem of deterioration in the performance thereof when a large amount of moisture (~10% by volume) is present.

To solve such problems, development of an adsorbent that adsorbs and oxidizes of the hydrocarbon at a temperature lower than the temperature at which the three-way catalysts are active, exhibits excellent hydrocarbon adsorption and oxidation abilities even in the presence of the large amount of moisture, and improves hydrothermal stability of the device is required.

PRIOR ART LITERATURE

Patent Literature (Patent Document 1) Japanese Patent Publication Application No. 2012-512022 (2012 May 31)

SUMMARY

One purpose of the present disclosure is to provide a hydrocarbon adsorption and desorption complex composed of a gas adsorbing portion containing zeolite with a low molar ratio of silicon to aluminum (Si/Al) and a reinforcing portion containing zeolite composed of silicon to adsorb a large amount of hydrocarbon in a cold start period and exhibit hydrothermal stability, and a method for preparing the same.

One aspect of the present disclosure provides a hydrocarbon adsorption and desorption complex including: a gas adsorbing portion containing zeolite particles, wherein a molar ratio of silicon to aluminum (Si/Al) of the zeolite particles is in a range from 1 to 50; and a reinforcing portion formed on a surface of the gas adsorbing portion, and containing silica-zeolite particles having the same structure as the zeolite particles of the gas adsorbing portion, wherein metal ions are bound to the zeolite particles of the gas adsorbing portion, and metal oxides are disposed at an interface between the silica-zeolite particles of the reinforcing portion and the gas adsorbing portion.

Another aspect of the present disclosure provides a method for preparing a hydrocarbon adsorption and desorption complex including: forming a gas adsorbing portion by mixing zeolite particles with a solution containing metal ions; and adding the zeolite particles of the gas adsorbing portion to a sol solution containing a silicon precursor and a structure directing agent, and performing hydrothermal synthesis on the sol solution for 3 hours to 96 hours to form a reinforcing portion, wherein a molar ratio of silicon to aluminum (Si/Al) of the zeolite particles of the gas adsorbing portion is in a range from 1 to 50.

The hydrocarbon adsorption and desorption complex according to the present disclosure may have the improved adsorption ability of the hydrocarbon as the metal ions are bound to the gas adsorbing portion containing the aluminum, and may have the improved hydrothermal stability as the reinforcing portion made of the silica is formed on the surface of the gas adsorbing portion.

BRIEF DESCRIPTION OF DRAWINGS

FIG. 1 is an image showing a schematic diagram of a hydrocarbon adsorption and desorption complex according to an embodiment of the present disclosure.

FIGS. 2 and 3 are images taken with a scanning electron microscope (SEM) and X-ray diffraction analysis (XRD) graphs of hydrocarbon adsorption and desorption complexes according to Examples of the present disclosure.

FIG. 4 shows graphs of cold start test results of hydrocarbon adsorption and desorption complexes according to Examples of the present disclosure.

FIG. 5 is a graph showing a weight ratio of a reinforcing portion to a gas adsorbing portion and hydrocarbon treatment efficiency based on a reinforcing portion synthesis time of hydrocarbon adsorption and desorption complexes according to Examples of the present disclosure.

FIG. 6 shows graphs of cold start test results of hydrocarbon adsorption and desorption complexes according to other Examples of the present disclosure.

FIG. 7 is a graph showing a weight ratio of a reinforcing portion to a gas adsorbing portion and hydrocarbon treatment efficiency based on a reinforcing portion synthesis time of hydrocarbon adsorption and desorption complexes according to other Examples of the present disclosure.

DETAILED DESCRIPTIONS

Hereinafter, a preferred embodiment according to the present disclosure will be described in more detail with reference to the accompanying drawings in order to describe the present disclosure in more detail. However, the present disclosure may be embodied in other forms without being limited to the embodiment described herein.

In this specification, 'total hydrocarbon' means hydrocarbon based on methane. Specifically, it is obtained by converting propene, toluene, and the like into values corresponding to the methane through gas chromatography (GC FID), and quantifying the values as converted amounts of methane.

The present disclosure provides a hydrocarbon adsorption and desorption complex including: a gas adsorbing portion containing zeolite particles, wherein a molar ratio of silicon to aluminum (Si/Al) of the zeolite particles is in a range from 1 to 50; and a reinforcing portion formed on a surface of the gas adsorbing portion, and containing silica-zeolite particles having the same structure as the zeolite particles of the gas adsorbing portion, wherein metal ions are bound to the zeolite particles of the gas adsorbing portion, and metal oxides are disposed at an interface between the silica-zeolite particles of the reinforcing portion and the gas adsorbing portion.

FIG. 1 is an image schematically showing a hydrocarbon adsorption and desorption complex according to the present disclosure. In FIG. 1, the hydrocarbon adsorption and desorption complex of the present disclosure includes the gas adsorbing portion made of the zeolite particles with a high aluminum content and the reinforcing portion made of the silica-zeolite particles. Specifically, the gas adsorbing portion may be surrounded by the reinforcing portion.

For example, the hydrocarbon adsorption and desorption complex according to the present disclosure may have the gas adsorbing portion and the reinforcing portion formed in a core-shell structure. In this connection, a core portion may be the gas adsorbing portion, and a shell portion may be the reinforcing portion.

Specifically, the molar ratio of silicon to aluminum (Si/Al) of the zeolite particles of the gas adsorbing portion may be in the range from 1 to 50, in a range from 5 to 50, in a range from 5 to 45, or in a range from 5 to 40. By containing the zeolite particles having the molar ratio of silicon to aluminum as described above, when the metal ions are supported, the metal ions may be bound to the zeolite particles to improve a hydrocarbon adsorption ability.

The zeolite particles of the gas adsorbing portion may independently be at least one zeolite of MFI (Zeolite Socony Mobil-five), beta (BEA), chabazite (CHA), KFI, MOR, FAU, FER, AEI, LEV, ERI, AFX, SFW, DDR, and LTA, and the reinforcing portion may contain the same kind of silica-zeolite. The zeolite of the MFI framework structure is zeolite that has the Si/Al value in a range from 10 to 15 or in a range from 10 to 12, and has a hydrogen cation bonded to an active site of the zeolite. Further, the beta (BEA) zeolite is zeolite that has the Si/Al value in a range from 10 to 25 or in a range from 10 to 20, and has the hydrogen cation bonded to the active site of the zeolite.

When the zeolite particles are contained as above, a hydrocarbon adsorption performance of the hydrocarbon adsorption and desorption complex is improved because of a high content of metal ions that are bound to an interior of pores of the zeolite, and a hydrocarbon oxidation performance of the hydrocarbon adsorption and desorption complex is improved because of a small size of the metal oxide located at the interface between the zeolite particles.

A size of the hydrocarbon adsorption and desorption complex may be in a range from 50 to 5000 nm. Specifically, the size of the hydrocarbon adsorption and desorption complex may be in a range from 50 to 4000 nm, in a range from 100 to 2000 nm, or in a range from 200 to 1000 nm.

Further, the micropores are present in the zeolite particles of the gas adsorbing portion, and the metal ions are bound to the interior of the pores present in the zeolite particles of the gas adsorbing portion. Specifically, a volume of the micropores of the zeolite particles of the gas adsorbing portion may be in a range from 0.05 to 0.25 $cm^3/g$, in a range from 0.07 to 0.2 $cm^3/g$, or in a range from 0.1 to 0.18 $cm^3/g$. As described above, the micropores exist in the zeolite particles, and the metal ions are bound to the micropores, so that the adsorption ability of the hydrocarbon such as the propene and the toluene may be improved.

The metal ion may be a cation of at least one metal among elements of Groups 3 to 12. Specifically, the metal ion may be a cation of one of iron, cobalt, nickel, copper, zinc, rhodium, and cadmium. More specifically, the metal ion may be a cation of monovalent iron, divalent iron, trivalent iron, monovalent cobalt, divalent cobalt, monovalent nickel, divalent nickel, monovalent copper, or divalent copper.

Further, the metal oxide may be disposed at the interface between the silica-zeolite particles of the reinforcing portion and the gas adsorbing portion. The metal oxide may be an oxide of at least one metal among elements of Groups 3 to 12. Specifically, the metal oxide may be an oxide of one of iron, cobalt, nickel, copper, zinc, rhodium, and cadmium. More specifically, the metal oxide may be $FeO$, $Fe_3O_4$, $Fe_2O_3$, $Co_3O_4$, $CoO$, $NiO$, $Cu_2O$, $Cu_2O_3$, or $CuO$.

For example, the metal oxide, which is positioned at the interface between the silica-zeolite particles of the reinforcing portion and the gas adsorbing portion, may have an average diameter in a range from 1 to 10 nm. Specifically, the average diameter of the metal oxide may be in a range from 1 to 9 nm, in a range from 1 to 7 nm, in a range from 2 to 8 nm, or in a range from 2 to 6 nm. By locating the metal oxide as described above on the interface between the silica-zeolite particles of the reinforcing portion and the gas adsorbing portion, the hydrocarbon adsorption and desorption complex according to the present disclosure may have a low oxidation temperature of the hydrocarbon and high hydrothermal stability.

The hydrocarbon adsorption and desorption complex according to the present disclosure may have a weight ratio in a range from 5 to 95 of the reinforcing portion to the gas adsorbing portion. Specifically, the hydrocarbon adsorption and desorption complex may have the weight ratio of the reinforcing portion to the gas adsorption portion in a range from 20 to 90, in a range from 20 to 80, in a range from 15 to 90, in a range from 15 to 80, or in a range from 15 to 60. As described above, by adjusting the weight ratio of the gas adsorbing portion and the reinforcing portion, it is possible to efficiently control a hydrocarbon treatment efficiency and the hydrothermal stability of the hydrocarbon adsorption and desorption complex.

By having the above characteristics, the hydrocarbon adsorption and desorption complex according to the present disclosure may satisfy a following Equation 1:

$$\left[1 - \frac{Q_{out}}{Q_{in}}\right] \times 100 > A \qquad \text{[Equation 1]}$$

In Equation 1 above, $Q_{In}$ represents a total amount of hydrocarbon injected into the hydrocarbon adsorption and desorption complex, $Q_{Out}$ represents a total amount of hydrocarbon emitted through the hydrocarbon adsorption and desorption complex, and A is a number equal to or greater than 10 and represents the hydrocarbon treatment efficiency.

Equation 1 above is an equation of calculating an overall hydrocarbon treatment efficiency of the hydrocarbon adsorption and desorption complex through a ratio of a total amount of hydrocarbon injected into the hydrocarbon adsorption and desorption complex and a total amount of hydrocarbon emitted through the hydrocarbon adsorption and desorption complex up to 300° C., which indicates that the complete three-way catalyst activity has not yet been reached, by injecting the hydrocarbon into the hydrocarbon adsorption and desorption complex and measuring the amount injected and the amount of hydrocarbon emitted from the hydrocarbon adsorption and desorption complex. In this connection, the overall hydrocarbon treatment efficiency, A, may be equal to or greater than 10, equal to or greater than 15, equal to or greater than 20, equal to or greater than 25, equal to or greater than 30, equal to or greater than 40, equal to or greater than 50, equal to or greater than 60, or equal to or greater than 70.

Further, the hydrocarbon adsorption and desorption complex according to the present disclosure may exhibit the adsorption ability of the hydrocarbon at a temperature equal to or lower than 300° C., and an oxidation ability of the hydrocarbon at a temperature equal to or higher than 200° C. Specifically, the hydrocarbon adsorption and desorption complex of the present disclosure may exhibit the adsorption ability of the hydrocarbon at a temperature between 70° C. and 300° C. or between 100° C. and 300° C., and may exhibit the oxidation ability of the hydrocarbon at a temperature equal to or higher than 210° C., equal to or higher than 220° C., equal to or higher than 230° C., equal to or higher than 240° C., or equal to or higher than 250° C. Usually, 50 to 80% of the total hydrocarbon emitted during the travel is emitted in the cold start period (equal to or lower than 300° C.). Because of the above characteristic, the hydrocarbon adsorption and desorption complex according to the present disclosure may efficiently adsorb and oxidize the hydrocarbon also in the cold start period, and exhibit the high hydrothermal stability.

In addition, the hydrocarbon adsorption and desorption complex according to the present disclosure may have a hydrocarbon adsorption amount in a range from 0.1 to 1.5 $mmol_{CH4}/g$, and a hydrocarbon oxidation start temperature in a range from 180° C. to 350° C. Specifically, the hydrocarbon adsorption and desorption complex of the present disclosure may have the hydrocarbon adsorption amount in a range from 0.1 to 1.3 $mmol_{CH4}/g$, in a range from 0.3 to 1.2 $mmol_{CH4}/g$, or in a range from 0.3 to 0.6 $mmol_{CH4}/g$, and the hydrocarbon oxidation start temperature in a range from 180° C. to 320° C., in a range from 180° C. to 300° C., or in a range from 180° C. to 250° C. In this connection, the oxidation start temperature refers to a temperature at which an amount of $CO_2$ generated relative to the total hydrocarbon is equal to or higher than 5%.

The hydrocarbon adsorption and desorption complex according to the present disclosure may be subjected to a hydrothermal treatment using 5 to 15% by volume of water vapor at a temperature in a range from 600° C. to 900° C. for 1 hour to 96 hours. Specifically, the hydrocarbon adsorbent may be subjected to the hydrothermal treatment at a temperature in a range from 600° C. to 850° C., in a range from 600° C. to 800° C., in a range from 600° C. to 750° C., or in a range from 700° C. to 800° C. for 1 hour to 72 hours, 1 hour to 36 hours, or 5 hours to 30 hours. In this connection, a gas flow rate per hour of simulated exhaust gas containing water vapor for a weight of the hydrocarbon adsorption and desorption complex may be in a range from 10,000 to 200,000 mL/g·h or in a range from 100,000 to 200,000 mL/g·h. The above condition is a severe condition similar to that in a case in which the vehicle is operated for a long period of time. The hydrocarbon adsorption and desorption complex that has been subjected to the hydrothermal treatment as described above may deteriorate in the performance of adsorbing and oxidizing the hydrocarbon and may deteriorate in durability in the presence of water vapor.

For example, the hydrocarbon adsorption and desorption complex that has been subjected to the hydrothermal treatment may have A, which is the overall hydrocarbon treatment efficiency in Equation 1, equal to or greater than 3, equal to or greater than 7, equal to or greater than 10, equal to or greater than 30, or equal to or greater than 40. Although the hydrocarbon adsorption and desorption complex that has been subjected to the hydrothermal treatment shows relatively low hydrocarbon treatment efficiency compared to the hydrocarbon adsorption and desorption complex that has not been subjected to the hydrothermal treatment, the hydrocarbon adsorption and desorption complex including the reinforcing portion made of the silica-zeolite exhibits improved heat resistance and exhibits excellent adsorption and oxidation abilities after the hydrothermal treatment compared to the existing hydrocarbon adsorption and desorption complex having only the gas adsorbing portion.

The hydrocarbon adsorption and desorption complex according to the present disclosure may be utilized as a selective catalytic reduction (SCR) in addition to the hydrocarbon adsorption performance, thereby effectively removing the nitrogen oxide (NOx) and exhibiting an air purification ability.

Further, the present disclosure provides a method for preparing a hydrocarbon adsorption and desorption complex including: forming a gas adsorbing portion by mixing zeolite particles with a solution containing metal ions; and adding the zeolite particles of the gas adsorbing portion to a sol solution containing a silicon precursor and a structure directing agent, and performing hydrothermal synthesis on the sol solution for 3 hours to 96 hours to form a reinforcing portion, wherein a molar ratio of silicon to aluminum (Si/Al) of the zeolite particles of the gas adsorbing portion is in a range from 1 to 50.

The hydrocarbon adsorption and desorption complex prepared using the method for preparing the hydrocarbon adsorption and desorption complex according to the present disclosure may be composed of the gas adsorbing portion and the reinforcing portion, and the gas adsorbing portion and the reinforcing portion may be formed in a core-shell structure. In this connection, a core portion may be the gas adsorbing portion, and a shell portion may be the reinforcing portion.

In the method for preparing the hydrocarbon adsorption and desorption complex according to the present disclosure, the molar ratio of silicon to aluminum (Si/Al) of the zeolite particles of the gas adsorbing portion may be in the range from 1 to 50, in a range from 5 to 50, in a range from 5 to 45, or in a range from 5 to 40. By forming the zeolite particles having the molar ratio of silicon to aluminum as described above, when metal ions are supported, the metal ions may be bound to the zeolite particles to improve a hydrocarbon adsorption ability.

Specifically, the zeolite particles of the gas adsorbing portion may independently be zeolite of a MFI (Zeolite Socony Mobil-five) framework structure or beta (BEA) zeolite. The zeolite of the MFI framework structure is zeolite that has the Si/Al value in a range from 10 to 15 or in a range from 10 to 12, and has a hydrogen cation bonded to an active site of the zeolite. Further, the beta (BEA) zeolite is zeolite that has the Si/Al value in a range from 10 to 25 or in a range from 10 to 20, and has the hydrogen cation bonded to the active site of the zeolite.

When the zeolite particles are contained as above, an adsorption ability of the hydrocarbon adsorption and desorption complex is improved because of a high content of metal ions that are bound to an interior of pores of the zeolite, and an oxidation performance on the adsorbed hydrocarbon is exhibited because of a small size of metal oxide formed on a surface of the zeolite particles.

The forming of the gas adsorbing portion includes forming the gas adsorbing portion by mixing the zeolite particles with a metal precursor solution containing metal ions using one of a wet impregnation method, a dry impregnation method, and an ion exchange method as a mixing method, wherein a content of the metal may be in a range from 1 to 9 wt %, in a range from 2 to 8 wt %, in a range from 3 to 8 wt %, or in a range from 4 to 7 wt %. Specifically, the forming of the gas adsorbing portion may include forming zeolite particles impregnated with the metal ions are using one of the wet impregnation method, the dry impregnation method, and the ion exchange method.

The solution containing the metal ions may contain a cation of at least one metal among elements of Groups 3 to 12. Specifically, the solution containing the metal ions may contain a cation of one of iron, cobalt, nickel, copper, zinc, rhodium, and cadmium. More specifically, the metal ion may be a cation of monovalent iron, divalent iron, trivalent iron, monovalent cobalt, divalent cobalt, monovalent nickel, divalent nickel, monovalent copper, or divalent copper.

The metal oxide formed by mixing the solution containing the metal ions with the zeolite may be an oxide of at least one metal among elements of Groups 3 to 12. Specifically, the metal oxide may be an oxide of one of iron, cobalt, nickel, copper, zinc, rhodium, and cadmium. More specifically, the metal oxide may be $FeO$, $Fe_3O_4$, $Fe_2O_3$, $Co_3O_4$, $CoO$, $NiO$, $Cu_2O$, $Cu_2O_3$, or $CuO$.

The zeolite particles may be mixed with the solution containing the metal ions to form the mixture, and the mixture may be calcined to form the metal oxide on the zeolite particles. An average diameter of the formed metal oxide may be in a range from 1 to 10 nm. Specifically, the average diameter of the metal oxide may be in a range from 1 to 9 nm, in a range from 1 to 7 nm, in a range from 2 to 8 nm, or in a range from 2 to 6 nm. By locating the metal oxide as described above on the interface between the silica-zeolite particles of the reinforcing portion and the gas adsorbing portion, the hydrocarbon adsorbent according to the present disclosure may exhibit excellent hydrocarbon adsorption performance, have a low oxidation temperature of the hydrocarbon, and have high hydrothermal stability.

The forming of the reinforcing portion may be performed by adding the zeolite particles impregnated with the metal ions to the sol solution containing the silicon precursor and the structure directing agent, and performing the hydrothermal synthesis on the sol solution for 3 hours to 96 hours.

Specifically, the sol solution may have a molar ratio of silicon precursor: structure directing agent: solvent of 10:1 to 15:10 to 50000, and more specifically, have the molar ratio of silicon precursor: structure directing agent: solvent of 10:2 to 7:50 to 10000 or 10:1 to 4:100 to 3000.

Specifically, the silicon precursor, which is silicon dioxide ($SiO_2$), may be tetramethyl orthosilicate (TMOS), tetraethyl orthosilicate (TEOS), tetrapropyl orthosilicate (TPOS), tetrabutyl orthosilicate (TBOS), fumed silica, or colloidal silica, and the solvent may be distilled water ($H_2O$) or ethanol.

Further, the organic structure directing agent may be at least one selected from a group consisting of tetrapropylammonium hydroxide (TPAOH), tetraethylammonium hydroxide (TEAOH), N,N,N-trimethyl adamantylammonium hydroxide (TMAdaOH), N,N,N-trimethyl adamantylammonium bromide (TMAdaBr), N,N,N-trimethyl adamantylammonium fluoride (TMAdaF), N,N,N-trimethyl adamantylammonium chloride (TMAdaCl), N,N,N-trimethyl adamantylammonium iodide (TMAdaI), tetraethylammonium bromide (TEABr), tetraethylammonium fluoride (TEAF), tetraethylammonium chloride (TEACl), tetraethylammonium iodide (TEAI), tetrapropylammonium bromide (TPABr), tetrabutylphosphonium hydroxide (TBPOH), tetrabutylammonium chloride (TBACl), tetrabutylammonium hydroxide (TBAOH), tetrabutylammonium fluoride (TBAF), and cyclohexylamine, and more specifically, may be the tetrapropylammonium hydroxide (TPAOH) or the tetraethylammonium hydroxide (TEAOH).

Further, in the forming of the reinforcing portion, a mixing ratio of the zeolite particles of the gas adsorbing portion to the sol solution may be in a range from 0.03 g/30 mL to 3 g/30 mL, in a range from 0.05 g/30 mL to 3 g/30 mL, in a range from 0.05 g/30 mL to 2 g/30 mL, in a range from 0.05 g/30 mL to 0.5 g/30 mL, in a range from 0.05 g/30 mL to 0.4 g/30 mL, in a range from 0.1 g/30 mL to 2 g/30 mL, in a range from 0.1 g/30 mL to 0.5 g/30 mL, in a range from 0.15 g/30 mL to 1 g/30 mL, or in a range from 0.15 g/30 mL to 0.35 g/30 mL.

When the reinforcing portion is formed by mixing the sol solution with the zeolite particles of the gas adsorbing portion in the same ratio as above, by forming the reinforcing portion in an appropriate weight ratio, the hydrothermal stability may be improved without impairing the hydrocarbon adsorption ability.

In addition, the forming of the reinforcing portion may be performed by mixing the zeolite particles of the gas adsorbing portion with the sol solution, and performing the hydrothermal synthesis on the sol solution at a temperature in a range from 50° C. to 300° C. or in a range from 100° C. to 200° C. for 4 hours to 96 hours, 4 hours to 12 hours, or 24 hours to 48 hours. In this connection, silica-zeolite particles having the same structure as the zeolite particles of the gas adsorbing portion are formed on the surface of the zeolite particles of the gas adsorbing portion through the hydrothermal synthesis process.

As described above, the metal cation impregnation and the metal oxide formation occur in the gas adsorbing portion during the metal supporting process, and the reinforcing portion is formed by the silica-zeolite particles, so that the hydrocarbon adsorbent according to the present disclosure may have excellent hydrocarbon adsorption performance, low hydrocarbon oxidation temperature, and high hydrothermal stability. In the hydrocarbon adsorbent prepared through the process as above, the hydrocarbon adsorption and desorption complex may have a weight ratio in a range from 5 to 95 of the reinforcing portion to the gas adsorbing portion. Specifically, the hydrocarbon adsorption and desorption complex may have the weight ratio of the reinforcing portion to the gas adsorption portion in a range from 20 to 90, in a range from 20 to 80, in a range from 15 to 90, in a range from 15 to 80, or in a range from 15 to 60. As described above, by adjusting the weight ratio of the gas adsorbing portion and the reinforcing portion, it is possible to efficiently control the hydrocarbon treatment efficiency and the hydrothermal stability of the hydrocarbon adsorption and desorption complex.

The method for preparing the hydrocarbon adsorbent according to the present disclosure may further include performing the hydrothermal treatment by injecting 5 to 15% by volume of water vapor thereto at a temperature in a range from 600° C. to 900° C. for 1 hour to 96 hours after the forming of the reinforcing portion. Specifically, the performing of the hydrothermal treatment may be performed by performing heat treatment after injecting the 5 to 15% by volume of water vapor at a temperature in a range from 600° C. to 800° C., in a range from 600° C. to 750° C., in a range from 600° C. to 700° C., or in a range from 700° C. to 800° C. for 1 hour to 72 hours, 1 hour to 36 hours, or 5 hours to 30 hours. In this connection, a gas flow rate per hour of simulated exhaust gas containing water vapor for a weight of the hydrocarbon adsorption and desorption complex may be in a range from 10,000 to 200,000 mL/g·h or in a range from 100,000 to 200,000 mL/g·h. The above condition is a severe condition similar to that in a case in which the vehicle is operated for a long period of time.

Although the hydrocarbon adsorption and desorption complex that has been subjected to the hydrothermal treatment shows relatively low hydrocarbon treatment efficiency compared to the hydrocarbon adsorption and desorption complex that has not been subjected to the hydrothermal treatment, the hydrocarbon adsorption and desorption complex including the reinforcing portion made of the silica-zeolite exhibits improved heat resistance and exhibits excellent adsorption and oxidation abilities after the hydrothermal treatment compared to the existing hydrocarbon adsorption and desorption complex having only the gas adsorbing portion.

In addition, the present disclosure provides the hydrocarbon adsorption and desorption complex for the vehicle including the hydrocarbon adsorption and desorption complex described above. The hydrocarbon adsorption and desorption complex according to the present disclosure exhibits the excellent adsorption ability, has the hydrocarbon oxidation ability at a temperature of about 200° C., which allows the adsorbed hydrocarbon to be oxidized also at a relatively low temperature, and exhibits the hydrothermal stability at a high temperature, so that the hydrocarbon adsorption and desorption complex according to the present disclosure may be applied to the removal of the hydrocarbon emitted from the vehicle exhaust gas, and may be expected to have an air purification effect by exhibiting the excellent hydrocarbon adsorption and oxidation abilities even in the cold start period before the three-way catalysts are sufficiently active.

Hereinafter, Examples of the present disclosure will be described. However, the following Examples are only preferred examples of the present disclosure, and the scope of the present disclosure is not limited by the following Examples.

EXAMPLE

Example 1 (MFI/MFI)

The zeolite particles of the gas adsorbing portion were prepared by supporting 5 wt % Cu on H-form ZSM-5 particles having a Si/Al ratio of 10 using the wet impregnation method. A sol solution with a molar ratio of 40 TEOS (tetraethyl orthosilicate): 9 TPAOH (tetrapropylammonium hydroxide): 9600 $H_2O$ was prepared, and was mixed with the zeolite particles of the gas adsorbing portion such that a ratio of the zeolite particles of the gas adsorbing portion and the sol solution becomes 0.3 g/30 ml to form a mixture. Then, the mixture was placed in a Teflon liner and was subjected to the hydrothermal synthesis in an oven at 100° C. for each time period (3 hours, 6 hours, 9 hours, 12 hours, and 24 hours) to form the reinforcing portion on the surface of the gas adsorbing portion to prepare a hydrocarbon adsorption and desorption complex.

Example 2 (BEA/BEA)

The zeolite particles of the gas adsorbing portion were prepared by supporting 5 wt % Cu on H-form ZSM-5 particles having a Si/Al ratio of 19 using the wet impregnation method. A sol solution with a molar ratio of 1 $SiO_2$: 0.4 TEAOH (tetraethylammonium hydroxide): 11.6 $H_2O$ was prepared, and was mixed with the zeolite particles of the gas adsorbing portion such that a ratio of the zeolite particles of the gas adsorbing portion and the sol solution becomes 0.3 g/30 ml to form a mixture. Then, the mixture was placed in the Teflon liner and was subjected to the hydrothermal synthesis in an oven at 130° C. for each time period (24 hours, 48 hours, and 96 hours) to form the reinforcing portion on the surface of the gas adsorbing portion to prepare a hydrocarbon adsorption and desorption complex.

Example 3 (MFI/MFI_HT)

The hydrocarbon adsorption and desorption complex prepared in Example 1 above was subjected to the hydrothermal treatment using 10% by volume of $H_2O$ water vapor under an air stream at 800° C. for 24 hours to prepare a hydrocarbon adsorption and desorption complex. In this connection, the gas flow rate per hour of the simulated exhaust gas containing the water vapor for the weight of the hydrocarbon adsorption and desorption complex is 100,000 mL·g$^{-1}$·h$^{-1}$.

Example 4 (BEA/BEA_HT)

The hydrocarbon adsorption and desorption complex prepared in Example 2 above was subjected to the hydrothermal treatment using 10% by volume of H$_2$O water vapor under an air stream at 800° C. for 24 hours to prepare a hydrocarbon adsorption and desorption complex. In this connection, the gas flow rate per hour of the simulated exhaust gas containing the water vapor for the weight of the hydrocarbon adsorption and desorption complex is 100,000 mL·g$^{-1}$·h$^{-1}$.

Experimental Example

Experimental Example 1

In order to identify a form of the hydrocarbon adsorption and desorption complex according to the present disclosure, the hydrocarbon adsorption and desorption complexes of Examples 1 and 2 were photographed with a scanning electron microscope (SEM), and were subjected to X-ray diffraction analysis (XRD). Results are shown in FIGS. 2 and 3.

In FIG. 2, as the hydrocarbon adsorption and desorption complex of Example 1, the silica-zeolite particles of the same type were formed on the surface of the gas adsorbing portion containing the zeolite particles of the MFI skeleton structure. (a) is a scanning electron microscope image of a gas adsorbing portion of zeolite particles of the MFI skeletal structure supported with copper ions, (b) is a scanning electron microscope image of a hydrocarbon adsorption and desorption complex prepared by performing hydrothermal synthesis of a gas adsorbing portion and a sol solution for 3 hours, (c) is a scanning electron microscope image of a hydrocarbon adsorption and desorption complex prepared by performing hydrothermal synthesis of a gas adsorbing portion and a sol solution for 6 hours, and (d) is a scanning electron microscope image of a hydrocarbon adsorption and desorption complex prepared by performing hydrothermal synthesis of a gas adsorbing portion and a sol solution for 9 hours. It was identified through the scanning electron microscope images that a form of the silica-zeolite particles of the reinforcing portion becomes clear as the synthesis time increases.

Further, in an X-ray diffraction analysis graph, even when a time period during which the reinforcing portion is formed (a hydrothermal synthesis time) increases, the X-ray diffraction analysis graph shows similarly to that of the zeolite of the MFI skeleton structure. Thus, it was identified that zeolite particles of other forms were not synthesized regardless of the time period for forming the reinforcing portion. Therefore, it may be seen that, in the hydrocarbon adsorption and desorption complex of Example 1, there is no zeolite having other structure other than the zeolite having the MFI skeleton structure.

In FIG. 3, as the hydrocarbon adsorption and desorption complex of Example 2, the silica-zeolite particles of the same type were formed on the surface of the gas adsorbing portion containing the zeolite particles of the BEA skeleton structure. (a) is a scanning electron microscope image of a gas adsorbing portion of zeolite particles of the BEA skeletal structure supported with copper ions, (b) is a scanning electron microscope image of a hydrocarbon adsorption and desorption complex prepared by performing hydrothermal synthesis of a gas adsorbing portion and a sol solution for 24 hours, (c) is a scanning electron microscope image of a hydrocarbon adsorption and desorption complex prepared by performing hydrothermal synthesis of a gas adsorbing portion and a sol solution for 48 hours, and (d) is a scanning electron microscope image of a hydrocarbon adsorption and desorption complex prepared by performing hydrothermal synthesis of a gas adsorbing portion and a sol solution for 96 hours. It was identified through the scanning electron microscope images that a form of the silica-zeolite particles of the reinforcing portion becomes clear as the synthesis time increases.

Further, in an X-ray diffraction analysis graph, even when a time period during which the reinforcing portion is formed (a hydrothermal synthesis time) increases, the X-ray diffraction analysis graph shows similarly to that of the zeolite of the BEA skeleton structure. Thus, it was identified that zeolite particles of other forms were not synthesized regardless of the time period for forming the reinforcing portion. Therefore, it may be seen that, in the hydrocarbon adsorption and desorption complex of Example 2, there is no zeolite having other structure other than the zeolite having the BEA skeleton structure.

Experimental Example 2

In order to identify a hydrocarbon adsorption amount and a hydrocarbon treatment efficiency based on the reinforcing portion synthesis time of the hydrocarbon adsorption and desorption complex according to the present disclosure, a cold start test (CST) was performed for each reinforcing portion synthesis time on the hydrocarbon adsorption and desorption complexes of Examples 1 and 2, and results are shown in FIGS. 4 to 6 and Table 1.

TABLE 1

| Sample | Total hydrocarbon adsorption amount (mmol$_{CH4}$/g) |
|---|---|
| Core (CuHZSM-5) | 0.3689 |
| Shell 3 h | 0.3769 |
| Shell 6 h | 0.3795 |
| Shell 9 h | 0.3391 |
| Shell 12 h | 0.3243 |
| Shell 24 h | 0.3181 |
| Core (CuHBEA) | 0.4761 |
| Shell 1 d | 0.4675 |
| Shell 2 d | 0.4880 |
| Shell 4 d | 0.4597 |
| Core (CuHZSM-5) HT | 0.0555 |
| Shell 3 h HT | 0.1367 |
| Shell 6 h HT | 0.2375 |
| Shell 9 h HT | 0.2505 |
| Shell 12 h HT | 0.2564 |
| Shell 24 h HT | 0.2604 |
| Core (CuHBEA) HT | 0.1087 |
| Shell 1 d HT | 0.3800 |
| Shell 2 d HT | 0.3657 |
| Shell 4 d HT | 0.2865 |

In the cold start test, a simulated exhaust gas feed of 100 mL/min flowed to 0.06 g zeolite particles that have subjected to a pre-treatment at 600° C. for 30 minutes under a 30 mL/min He condition. In this connection, the simulated exhaust gas feed is composed of 100 ppm propene, 100 ppm toluene, 1 volume % oxygen (O$_2$), 10 volume % water vapor (H$_2$O), and helium (He balance) 100 mL/min, and has feed/weight of 100,000 mL·g$^{-1}$·h$^{-1}$. The zeolite particles were exposed to the simulated exhaust gas feed at 70° C. for 5 minutes, increased in temperature with a temperature increasing rate of 53° C./min, and then exposed to the simulated exhaust gas feed at 600° C. for 5 minutes. Adsorption and desorption behaviors of the propene and the toluene of the hydrocarbon and the total hydrocarbons were identified.

In Table 1, an amount of adsorption until a concentration of the total hydrocarbon emitted is equal to a methane concentration (an inlet concentration, 1000 ppm) corresponding to the propene and the toluene was calculated as the total hydrocarbon adsorption amount.

FIG. 4 shows a graph showing a result of the cold start test of each of the hydrocarbon adsorption and desorption complexes of Examples 1 and 3 prepared with the reinforcing portion synthesis times of 3 hours, 6 hours, 9 hours, 12 hours, and 24 hours.

FIG. 5 is a graph showing a change in a weight ratio of the reinforcing portion to the gas adsorbing portion (left) and a hydrocarbon treatment efficiency (right) based on the reinforcing portion synthesis time of the hydrocarbon adsorption and desorption complexes of Examples 1 and 3.

In Table 1, FIGS. 4 and 5, in the case of the hydrocarbon adsorption and desorption complex of Example 1 that has not been subjected to the hydrothermal treatment, it was identified that an amount of propene adsorption decreases and an amount of toluene desorbed increases as the synthesis time of the reinforcing portion increases, and it was identified that the overall hydrocarbon treatment efficiency decreases as the synthesis time of the reinforcing portion increases. This is related to an increase in the weight ratio of the reinforcing portion to the gas adsorbing portion as the reinforcing portion synthesis time increases.

Further, it was identified that the hydrocarbon adsorption and desorption complex of Example 3 treated at 800° C. for 24 hours under a condition of an air flow mixed with 10% by volume $H_2O$ is not able to exhibit the hydrocarbon adsorption performance after being subjected to the hydrothermal treatment when only the gas adsorbing portion exists because the reinforcing portion was not formed. However, it was identified that the propene and toluene adsorption performance is gradually improved and then degraded when the reinforcing portion was formed. In the overall hydrocarbon treatment efficiency in FIG. 5, it may be seen that, as the reinforcing portion synthesis time increases, the overall hydrocarbon treatment efficiency of the particles that has been subjected to the hydrothermal treatment is increased compared to the hydrocarbon adsorption and desorption complex of Example 1 that has not been subjected to the hydrothermal treatment. In particular, it may be seen that, when the reinforcing portion is formed for 24 hours, the hydrothermal stability was improved as the reinforcing portion is formed, seeing that the complex that has not been subjected to the hydrothermal treatment and the complex that has been subjected to the hydrothermal treatment have the almost same overall hydrocarbon efficiency.

FIG. 6 shows a graph showing a result of the cold start test of each of the hydrocarbon adsorption and desorption complexes of Examples 2 and 4 prepared with the reinforcing portion synthesis times of 24 hours, 48 hours, and 96 hours.

FIG. 7 is a graph showing a change in a weight ratio of the reinforcing portion to the gas adsorbing portion (left) and a overall hydrocarbon treatment efficiency (right) based on the reinforcing portion synthesis time of the hydrocarbon adsorption and desorption complexes of Examples 2 and 4.

In Table 1, FIGS. 6 and 7, in the case of the hydrocarbon adsorption and desorption complex of Example 2 that has not been subjected to the hydrothermal treatment, it was identified that an amount of propene adsorption decreases after the reinforcing portion synthesis time, but the overall hydrocarbon treatment efficiency is similar regardless of the reinforcing portion synthesis time. Therefore, it may be seen that this is relates to the fact that the overall hydrocarbon treatment efficiency is similar regardless of the reinforcing portion synthesis time.

Further, it was identified that the hydrocarbon adsorption and desorption complex of Example 4 treated at 800° C. for 24 hours under a condition of an air flow mixed with 10% by volume $H_2O$ is not able to exhibit the hydrocarbon adsorption performance after being subjected to the hydrothermal treatment when only the gas adsorbing portion exists because the reinforcing portion was not formed. However, it was identified that the propene and toluene the adsorption performance is improved when the reinforcing portion was formed, and in particular, the propene and toluene the adsorption performance is the best when the reinforcing portion was formed for 24 hours, and then, the amount of propene and toluene adsorption gradually decreases as the reinforcing portion synthesis time increases. In the overall hydrocarbon treatment efficiency in FIG. 7, it was identified that the hydrocarbon adsorption and desorption complex, which synthesized the reinforcing portion for 24 hours, shows the highest overall hydrocarbon treatment efficiency after the hydrothermal treatment. As in Example 1, it may be seen that a reinforcing portion synthesis time range showing the hydrothermal stability while showing an optimum overall hydrocarbon treatment efficiency exists.

Therefore, the hydrocarbon adsorption and desorption complex according to the present disclosure may adjust the proportion of the reinforcing portion to the gas adsorbing portion by controlling the time period for synthesizing the reinforcing portion, thereby simultaneously improving the hydrocarbon adsorption ability and the hydrothermal stability of the complex compared to the existing hydrocarbon adsorption and desorption complex composed of only the gas adsorbing portion.

What is claimed is:

1. A hydrocarbon adsorption and desorption complex comprising:
   a gas adsorbing portion containing zeolite particles; and
   a reinforcing portion formed on a surface of the gas adsorbing portion, wherein the reinforcing portion contains silica-zeolite particles having the same crystal structure as the zeolite particles of the gas adsorbing portion,
   wherein metal ions are bound to the zeolite particles of the gas adsorbing portion, and metal oxides are disposed at an interface between the silica-zeolite particles of the reinforcing portion and the gas adsorbing portion,
   wherein the zeolite particles are MFI (Zeolite Socony Mobil-five) having a molar ratio of silicon to aluminum (Si/Al) in a range from 10 to 15, or beta (BEA) having a molar ratio of Si/Al value in a range from 10 to 25,
   wherein the metal ions are selected from the group consisting of monovalent iron, divalent iron, trivalent iron, monovalent cobalt, divalent cobalt, monovalent nickel, divalent nickel, monovalent copper, and divalent copper, and the metal oxides are selected from the group consisting of $FeO$, $Fe_3O_4$, $Fe_2O_3$, $Co_3O_4$, $CoO$, $NiO$, $Cu_2O$, $Cu_2O_3$, and $CuO$,
   wherein the gas adsorbing portion is formed by mixing the zeolite particles with a solution containing the metal ions and the reinforcing portion is formed by adding the zeolite particles of the gas adsorbing portion to a sol solution containing a silicon precursor and a structure directing agent, and performing hydrothermal synthesis on the sol solution at a temperature of 50° C. to 300° C. for 4 hours to 96 hours, and wherein the ratio of the weight of the reinforcing portion to the weight of the gas adsorbing portion is 15 to 90.

2. The hydrocarbon adsorption and desorption complex of claim 1, wherein the hydrocarbon adsorption and desorption complex satisfies a following Equation 1:

$$\left[1 - \frac{Q_{out}}{Q_{in}}\right] \times 100 > A \qquad \text{[Equation 1]}$$

in Equation 1 above, $Q_{In}$ represents a total amount of hydrocarbon injected into a hydrocarbon adsorbent, $Q_{Out}$ represents a total amount of hydrocarbon emitted through a hydrocarbon adsorbent, and A is a number equal to or greater than 10 and represents a hydrocarbon treatment efficiency.

3. The hydrocarbon adsorption and desorption complex of claim 1, wherein the hydrocarbon adsorption and desorption complex is further subjected to a hydrothermal treatment using 5 to 15% by volume of water vapor at a temperature in a range from 600° C. to 900° C. for 1 hour to 96 hours, wherein the hydrocarbon adsorption and desorption complex that has been subjected to the hydrothermal treatment has A in Equation 1 equal to or greater than 3.

4. The hydrocarbon adsorption and desorption complex of claim 1, wherein a size of the hydrocarbon adsorption and desorption complex is in a range from 50 to 5000 nm, wherein a size of the metal oxide is in a range from 1 to 10 nm.

5. The hydrocarbon adsorption and desorption complex of claim 1, wherein the metal ions are located on or within pores of the zeolite particles of the gas adsorbing portion.

6. The hydrocarbon adsorption and desorption complex of claim 1, wherein the hydrocarbon adsorption and desorption complex exhibits an adsorption ability at a temperature equal to or lower than 300° C., and exhibits an oxidation ability at a temperature equal to or higher than 180° C., wherein the adsorption ability is ability of the hydrocarbon adsorption and desorption complex to adsorb the hydrocarbon, and wherein the oxidation ability is ability of the hydrocarbon adsorption and desorption complex to achieve generation of $CO_2$ relative to a total hydrocarbon of equal to or higher than 5% by oxidizing the hydrocarbon.

7. The hydrocarbon adsorption and desorption complex of claim 1, wherein the hydrocarbon adsorption and desorption complex has a hydrocarbon adsorption amount in a range from 0.1 to 1.5 $mmol_{CH4}/g$, wherein the hydrocarbon adsorption and desorption complex has a hydrocarbon oxidation start temperature in a range from 180 to 350° C.

8. A method for preparing the hydrocarbon adsorption and desorption complex of claim 1, the method comprising:

forming the gas adsorbing portion by mixing the zeolite particles with the solution containing the metal ions; and adding the zeolite particles of the gas adsorbing portion to the sol solution containing the silicon precursor and the structure directing agent and performing hydrothermal synthesis on the sol solution for 4 hours to 96 hours to form the reinforcing portion, wherein a molar ratio of silicon to aluminum (Si/Al) of the zeolite particles of the gas adsorbing portion is in a range from 1 to 50.

9. The method of claim 8, wherein the metal ions contain a cation of at least one metal among elements of Groups 3 to 12.

10. The method of claim 8, wherein, in the forming of the reinforcing portion, the sol solution has a molar ratio of silicon precursor: structure directing agent: solvent of 10:1 to 15:10 to 50000, and has a mixing ratio of the gas adsorbing portion to the sol solution in a range from 0.03 g/30 mL to 3 g/30 mL.

11. The method of claim 8, wherein the organic structure directing agent is at least one selected from the group consisting of tetrapropylammonium hydroxide (TPAOH), tetraethylammonium hydroxide (TEAOH), N,N,N-trimethyl adamantylammonium hydroxide (TMAdaOH), N,N,N-trimethyl adamantylammonium bromide (TMAdaBr), N,N,N-trimethyl adamantylammonium fluoride (TMAdaF), N,N,N-trimethyl adamantylammonium chloride (TMAdaCl), N,N,N-trimethyl adamantylammonium iodide (TMAdaI), tetraethylammonium bromide (TEABr), tetraethylammonium fluoride (TEAF), tetraethylammonium chloride (TEACl), tetraethylammonium iodide (TEAI), tetrapropylammonium bromide (TPABr), tetrabutylphosphonium hydroxide (TBPOH), tetrabutylammonium chloride (TBACl), tetrabutylammonium hydroxide (TBAOH), tetrabutylammonium fluoride (TBAF), and cyclohexylamine.

12. The method of claim 8, further comprising performing a hydrothermal treatment by injecting 5 to 15% by volume of water vapor to the hydrocarbon adsorption and desorption complex at a temperature in a range from 600° C. to 900° C. for 1 hour to 96 hours after the forming of the reinforcing portion, wherein a gas flow rate per hour of simulated exhaust gas containing water vapor for a weight of the hydrocarbon adsorption and desorption complex is in a range from 10,000 to 200,000 mL/g·h.

13. A hydrocarbon adsorption and desorption complex for a vehicle including the hydrocarbon adsorption and desorption complex according to claim 1.

* * * * *